United States Patent
Rashid et al.

(10) Patent No.: US 10,929,342 B2
(45) Date of Patent: Feb. 23, 2021

(54) TECHNIQUES FOR LIMITING THE MAXIMUM STORAGE CONSUMED BY A FILE SYSTEM WITHOUT SHRINKING AN UNDERLYING VOLUME

(71) Applicant: EMC IP Holding Company LLC, Hopkinton, MA (US)

(72) Inventors: Ahsan Rashid, Edison, NJ (US); Walter C. Forrester, Berkeley Heights, NJ (US); Marc De Souter, Wayne, NJ (US); Morgan A. Clark, South Orange, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

(21) Appl. No.: 16/048,944

(22) Filed: Jul. 30, 2018

(65) Prior Publication Data

US 2020/0034445 A1    Jan. 30, 2020

(51) Int. Cl.
*G06F 16/00*        (2019.01)
*G06F 16/11*        (2019.01)

(52) U.S. Cl.
CPC .................. *G06F 16/122* (2019.01)

(58) Field of Classification Search
CPC ..................................... G06F 16/122
USPC ......................................... 707/812
See application file for complete search history.

(56) References Cited

U.S. PATENT DOCUMENTS

| | | | |
|---|---|---|---|
| 7,409,523 B2 * | 8/2008 | Pudipeddi | G06F 3/0607 711/153 |
| 8,285,758 B1 * | 10/2012 | Bono | G06F 16/185 707/822 |
| 8,356,150 B2 * | 1/2013 | Fachan | G06F 16/182 711/162 |
| 8,407,265 B1 * | 3/2013 | Scheer | G06F 16/1727 707/823 |
| 9,329,803 B1 | 5/2016 | Bono et al. | |
| 9,355,121 B1 | 5/2016 | Scheer et al. | |
| 9,400,741 B1 | 7/2016 | Bono et al. | |
| 9,430,492 B1 | 8/2016 | Bono et al. | |
| 9,933,945 B1 | 4/2018 | Mao et al. | |
| 9,940,331 B1 | 4/2018 | Bono et al. | |
| 2019/0286326 A1 * | 9/2019 | Pabon | G06F 3/0604 |

* cited by examiner

*Primary Examiner* — Monica M Pyo
(74) *Attorney, Agent, or Firm* — BainwoodHuang

(57) ABSTRACT

Techniques for limiting storage consumed by a file system without shrinking a volume upon which the file system is deployed. The techniques are employed in a clustered environment including multiple NAS nodes, each having access to block storage including multiple storage devices. By deploying the file system on a volume of a NAS node within the clustered environment, setting the value of the FS user size to be equal to the FS volume size, and if, at a later time, it is desired to reduce the file system size, setting the value of the FS user size to a lesser value than the FS volume size, IO requests received at the NAS node can be satisfied within the logical limit of the lesser value of the FS user size without shrinking the local volume, allowing the file system size to be reduced without requiring close coordination with the block storage.

12 Claims, 5 Drawing Sheets

TECHNIQUES FOR LIMITING THE MAXIMUM STORAGE CONSUMED BY A FILE SYSTEM WITHOUT SHRINKING AN UNDERLYING VOLUME

BACKGROUND

Data storage systems typically include one or more storage processors coupled to one or more arrays of non-volatile storage devices, such as magnetic disk drives, electronic flash drives, and/or optical drives. The storage processors are configured to service input/output (IO) requests generated by host computers that specify files, blocks, and/or other data elements to be created on, read from, written to, and/or deleted from the respective non-volatile storage device arrays. Such storage processors execute software that manage the incoming IO requests, as well as perform various data processing tasks to organize and secure the files, blocks, and/or other data elements on the non-volatile storage devices.

Some of the data storage systems described above may provide network attached storage (NAS) capabilities, in which the storage processors are configured to receive IO requests from host computers directed to file systems implemented on the respective data storage systems. Such IO requests typically conform to one or more file-based protocols such as the common Internet file system (CIFS), server message block (SMB), and network file system (NFS) protocols. In response to the IO requests, the data storage systems store and retrieve data to/from the file systems, which organize the data in one or more files and/or directories. Such file systems typically operate in close coordination with their underlying storage to provide data storage provisioning, among other features.

SUMMARY

In some data storage systems with network attached storage (NAS) capabilities, file systems are deployed on logical storage units known as "volumes." In such a data storage system, one or more slices of data storage can be provisioned to a volume upon which a file system is deployed. As employed herein, the term "slice" refers to a uniformly-sized data storage extent. For example, a slice may have a size equal to 256 megabytes (MB) or any other suitable size. Having provisioned the slices to the volume, the data storage system may subsequently delete certain files and/or directories from the file system, reducing the amount of storage space required by the file system and potentially resulting in an excess of slices provisioned to the volume. In such a situation, it may be desirable to shrink the size of the volume upon which the file system is deployed, reducing the size of the file system and freeing up or reclaiming at least some storage space that might be used for other purposes. For example, in some data storage systems, it may be possible to shrink the size of a volume by moving all blocks of data from a slice provisioned to the volume to one or more other slices of data storage with available space. Further, once the data blocks from one such slice have been moved, data blocks from another slice provisioned to the volume may be moved to another slice(s) of the data storage in a likewise fashion.

Reducing the size of a file system by shrinking a volume upon which the file system is deployed can be problematic, however, in a clustered storage environment that includes a plurality of NAS data storage nodes. Whereas file systems implemented on data storage systems in non-clustered storage environments can operate in close coordination with underlying storage to move data blocks from one slice to another in a volume shrink operation, file systems implemented on NAS data storage nodes in clustered storage environments generally do not allow such close operational coordination with underlying storage, due at least in part to difficulties in managing such coordination across many NAS data storage nodes that may support various different block storage technologies.

Techniques are disclosed herein for limiting the maximum data storage consumed by a file system, without shrinking a local volume upon which the file system is deployed. The disclosed techniques can be practiced in a clustered storage environment that includes a cluster manager node and a plurality of NAS data storage nodes (also referred to herein as "NAS data node(s)"), each of which has shared access to underlying storage including a plurality of non-volatile storage devices. One or more file systems can be implemented on each of the plurality of NAS data nodes, which can be interconnected to the cluster manager node and to one another by at least one network. In the disclosed techniques, each file system can be deployed on a local volume of a NAS data node in the clustered storage environment. The local volume is configured as a thin volume, such that storage space required by the thin volume is not mapped or allocated at its creation, but can be provided, up to the size of the file system, at a later time based on demand. Further, each of the plurality of non-volatile storage devices can be expressed as a logical unit or "LUN." The local volume can built on a logical block device of the NAS data node, and, once a LUN is available, the logical block device can be built on the LUN provisioned from the underlying storage. The file system, the local volume, the logical block device, and the LUN have distinct address spaces, which may or may not have a one-to-one correspondence to one another.

In one mode of operation, the NAS data node deploys the file system on its local volume, and an initial value of a user size of the file system (also referred to herein as the "FS user size") is set to be equal to the total size of the local volume (also referred to herein as the "FS volume size"). The NAS data node stores both the FS user size and the FS volume size as metadata on the LUN upon which its local volume is ultimately built. The NAS data node receives an IO request, namely, a write request, from a host computer to write data to a specified file or directory of the file system. Having received the write request, the NAS data node determines whether or not the write request can be satisfied within a logical limit of the FS user size. If the write request can be satisfied within the logical limit of the FS user size, then the NAS data node maps or allocates the write request to corresponding address blocks of the local volume's address space, which are translated to allow the data to be ultimately written to suitable address blocks of the LUN's address space. If the write request cannot be satisfied within the logical limit of the FS user size, then (i) the total size of the local volume can be extended by a predetermined amount to obtain an extended FS volume size, (ii) the value of the FS user size can be set to be equal to the extended FS volume size, and (iii) the value of the FS user size and the extended FS volume size can be stored as metadata on the LUN, overwriting the prior FS user size and FS volume size previously stored on the LUN. For example, a system administrator may initiate operations pertaining to extending the size of the local volume. It is noted that, if the FS user size was previously reduced to a value less than the FS volume size, then the system administrator may increase the value of the FS user size up to (or less than) the FS volume size, without having to extend the size of the local volume. The NAS data node can then map or allocate the write request to corresponding address blocks of the extended local volume's address space, which are translated to allow the data to be ultimately written to suitable address blocks of the LUN's address space, assuming sufficient free storage space is available for use on the LUN.

If, at a later time, it is desired to reduce the size of the file system, then the value of the FS user size can be set to a predetermined lesser value than the current value of the FS user size stored on the LUN, without shrinking the local volume upon which the file system is deployed, i.e., the FS volume size remains unchanged. Subsequent IO requests received at the NAS data node can then be satisfied within a logical limit of the lesser value of the FS user size. Further, once the value of the FS user size is set to be less than the FS volume size, at least some address blocks within the local volume's address space that were previously written to but later freed can be unmapped or de-allocated in a background process, freeing up or reclaiming storage space that might be used for other purposes.

By deploying a file system on a local volume of a NAS data node within a clustered storage environment, setting an initial value of the FS user size to be equal to the FS volume size, and, if, at a later time, it is desired to reduce the size of the file system, setting the value of the FS user size to a predetermined lesser value than the FS volume size while allowing the FS volume size to remain unchanged, IO requests subsequently received at the NAS data node can be satisfied within a logical limit of the lesser value of the FS user size, without shrinking the local volume. In this way, the size of the file system implemented on the NAS data node in the clustered storage environment can be reduced, without requiring close coordination with underlying storage.

In certain embodiments, a method of limiting the maximum data storage consumed by a file system, without shrinking a local volume upon which the file system is deployed, includes deploying the file system on a local volume of a data storage node. The file system has a file system user size, and the local volume has a local volume size. The method further includes setting the file system user size to be equal to the local volume size, determining that storage space requirements of the file system are less than the file system user size, and reducing the file system user size in accordance with the storage space requirements of the file system, without reducing the local volume size.

In certain arrangements, the method further includes receiving, at the data storage node, a write request to write data to the file system, determining whether the write request can be satisfied within a logical limit of the reduced file system user size, and, having determined that the write request can be satisfied within the logical limit of the reduced file system user size, writing the data to the file system deployed on the local volume.

In certain arrangements, the method further includes performing, in a background process, a scavenging operation to un-map or de-allocate at least some address blocks within an address space of the local volume that were previously written to and subsequently freed.

In certain arrangements, the method further includes receiving, at the data storage node, a write request to write data to the file system, and determining whether the write request can be satisfied within a logical limit of the reduced file system user size. Having determined that the write request cannot be satisfied within the logical limit of the reduced file system user size, increasing the file system user size up to (or less than) the local volume size, without extending the local volume size.

In certain arrangements, the method further includes receiving, at the data storage node, another write request to write data to the file system, determining whether the write request can be satisfied within a logical limit of the reduced file system user size, and, having determined that the write request cannot be satisfied within the logical limit of the reduced file system user size, extending the local volume size in accordance with the storage space requirements of the file system.

In certain arrangements, the method further includes setting the file system user size to be equal to the extended local volume size to obtain an increased file system user size.

In certain arrangements, the method further includes determining whether the write request can be satisfied within a logical limit of the increased file system user size, and, having determined that the write request can be satisfied within the logical limit of the increased file system user size, writing the data to the file system deployed on the local volume.

In certain arrangements, the method further includes receiving, at the data storage node, a write request to write data to the file system, determining whether the write request can be satisfied within a logical limit of the reduced file system user size, and, having determined that the write request cannot be satisfied within the logical limit of the reduced file system user size, issuing a write failure indication with respect to the file system due to insufficient storage space.

In certain arrangements, the local volume is built on an underlying storage device, and the method further includes storing the reduced file system user size and the local volume size in a superblock of metadata on the underlying storage device.

In certain embodiments, a data storage node is connected to a host computer by a computer network in a clustered storage environment. The data storage node includes an interface to the computer network, a memory, and one or more processing units configured to execute one or more programs out of the memory to deploy a file system on a local volume of the data storage node. The file system has a file system user size, and the local volume has a local volume size. The processing units are further configured to execute the programs out of the memory to facilitate (i) setting the file system user size to be equal to the local volume size, (ii) determining that storage space requirements of the file system are less than the file system user size, and (iii) reducing the file system user size in accordance with the storage space requirements of the file system, without reducing the local volume size.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings, in which like reference characters refer to the same parts throughout the different views.

DETAILED DESCRIPTION

Techniques are disclosed herein for limiting the maximum data storage consumed by a file system, without shrinking a local volume upon which the file system is deployed. The disclosed techniques can be practiced in a clustered storage environment that includes a cluster manager node and a plurality of network attached storage (NAS) data storage nodes, each of which has shared access to underlying storage including a plurality of non-volatile storage devices. By deploying the file system on a local volume of a NAS data storage node within the clustered storage environment, setting the value of a user size of the file system to be equal to the size of the local volume, and, if, at a later time, it is desired to reduce the size of the file system, setting the value of the file system user size to a lesser value than the local volume size while allowing the local volume size to remain unchanged, input/output (IO) requests subsequently received at the NAS data storage node can be satisfied within a logical limit of the lesser value of the file system user size, without shrinking the local volume. In this way, the size of the file system can be reduced, without requiring close coordination with the underlying storage.

Figure 1:
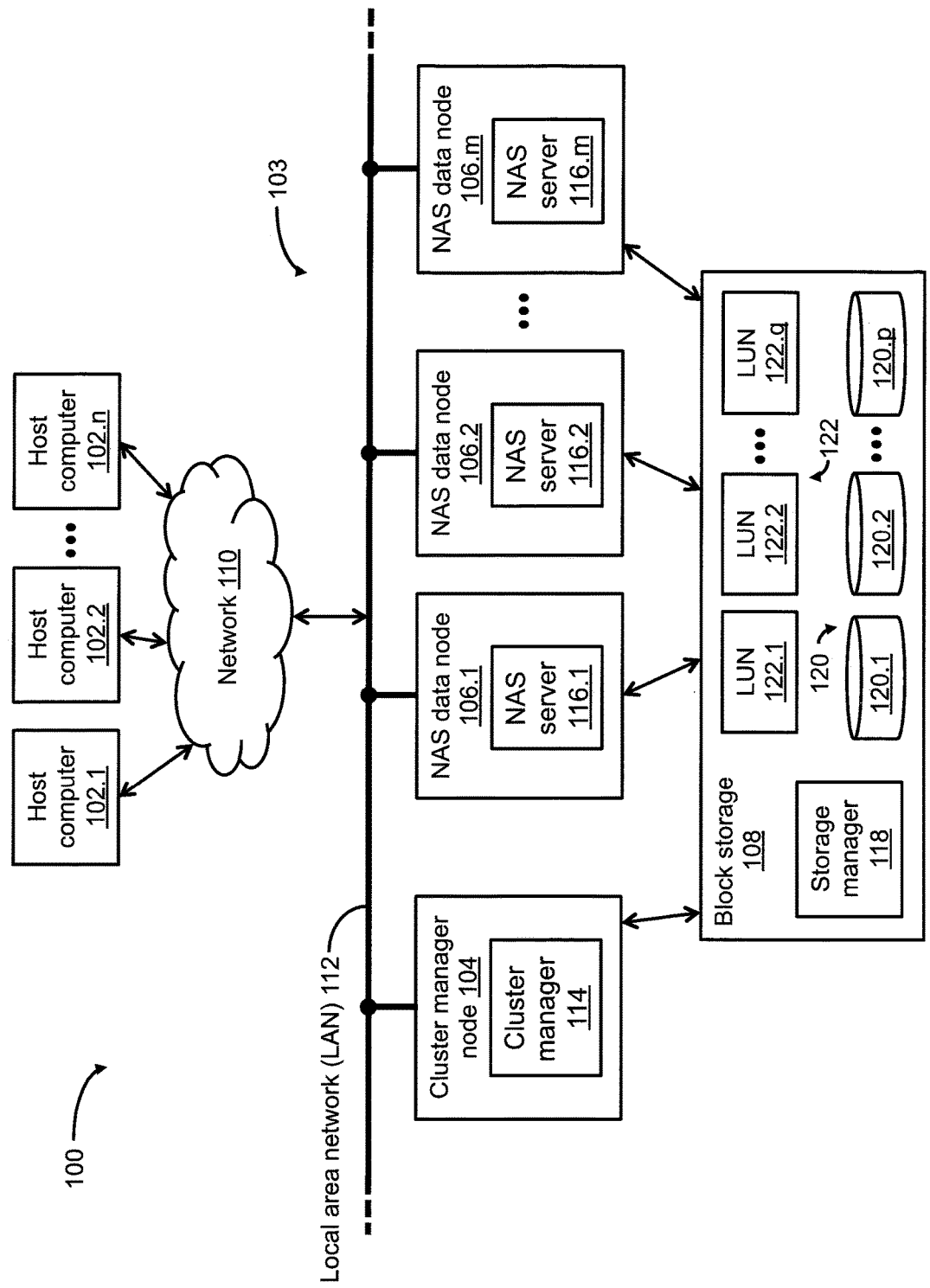
FIG. 1 is a block diagram of an exemplary clustered storage environment, in which techniques may be practiced for limiting the maximum data storage consumed by a file system without shrinking a local volume upon which the file system is deployed.

FIG. 1 depicts an illustrative embodiment of an exemplary clustered storage environment 100, in which techniques can be practiced for limiting the maximum data storage consumed by a file system without shrinking a local volume upon which the file system is deployed. As shown in FIG. 1, the clustered storage environment 100 includes a plurality of host computers 102.1, 102.2, . . . , 102.n interconnected to a cluster 103 of NAS data storage nodes 106.1, 106.2, . . . , 106.m (also referred to herein as "NAS data node(s)") by at least one computer network 110. Within the cluster 103, the NAS data nodes 106.1, 106.2, . . . , 106.m are interconnected to a cluster manager node 104 and to one another by a local area network (LAN) 112, such as an Ethernet-based LAN. The cluster manager node 104 includes a cluster manager 114, which is configured to provide a single entry point for control and/or management of the cluster 103. The NAS data nodes 106.1, 106.2, . . . , 106.m include NAS servers 116.1, 116.2, . . . , 116.m, respectively. Each of the cluster manager node 104 and the NAS data nodes 106.1, 106.2, . . . , 106.m has shared access to block storage 108, which can include a plurality of data storage drives 120, such as magnetic disk drives, electronic flash drives, and/or any other suitable data storage drive(s). It is noted that the cluster 103 of NAS data nodes 106.1, 106.2, . . . , 106.m and the cluster manager node 104 can be configured in accordance with software-defined storage (SDS) features, and can be deployed over a range of operating platforms including, but not limited to, a VMware ESXi™ bare metal hypervisor, a kernel-based virtual machine (KVM), and a Docker® container.

The block storage 108 can further include a storage manager 118, which is configured to manage block-based functions such as storage provisioning, snapshot generation, data replication, and/or any other suitable block-based function(s). In one embodiment, the storage manager 118 can manage the plurality of data storage drives 120.1, 120.2, . . . , 120.p as one or more groups of redundant arrays of independent disks (also referred to herein as "RAID group(s)"), as well as arrange the respective data storage drives 120.1, 120.2, . . . , 120.p as one or more logical units 122 (also referred to herein as "LUN(s)"). For example, each of the LUNs 122.1, 122.2, . . . , 122.q may be configured and arranged from (i) any suitable number of the data storage drives 120.1, 120.2, . . . , 120.p, (ii) multiple portions of the respective data storage drives 120.1, 120.2, . . . , 120.p, or (iii) a single portion of a respective one of the data storage drives 120.1, 120.2, . . . , 120.p. Further, each of the host computers 102.1, 102.2, . . . , 102.n may access data stored on the LUN 122.1, 122.2, . . . , or 122.q, by specifying an appropriate logical unit number and offset.

It is noted that each of the cluster manager node 104 and the NAS data nodes 106.1, 106.2, . . . , 106.m can be configured as any suitable computer or computerized device for processing IO requests (e.g., read requests, write requests) generated by the respective host computers 102.1, 102.2, . . . , 102.n. For example, each of the cluster manager node 104 and the NAS data nodes 106.1, 106.2, . . . , 106.m may include one or more circuit board assemblies and/or blades, which are configured to plug into one or more electronic chassis. Further, each such electronic chassis may include a backplane for use in interconnecting the cluster manager node 104 and the NAS data nodes 106.1, 106.2, . . . , 106.m over the LAN 112. It is further noted that each of the host computers 102.1, 102.2, . . . , 102.n can be configured as any suitable computer or computerized device for reading and/or writing data stored within the cluster 103 of NAS data nodes 106.1, 106.2, . . . , 106.m. For example, the respective host computers 102.1, 102.2, . . . , 102.n may be configured as personal computers, smartphones, tablet computers, Internet of Things (IoT) devices, workstations, enterprise servers, and/or any other suitable type(s) of computer(s) and/or computerized device(s) capable of exchanging data over the computer network 110. Further, the computer network 110 may include the Internet, a wide area network (WAN), a metropolitan network (MAN), a local area network (LAN), and/or any other suitable network(s) or combination of networks.

In one embodiment, the block storage 108 can be configured as any suitable block-based storage array such as a VMAX® storage array, a Storage Center™ array, or an XtremIO® storage array, each of which is offered by Dell EMC™, Hopkinton, Mass. USA. In the clustered storage environment 100, each of the cluster manager node 104 and the NAS data nodes 106.1, 106.2, . . . , 106.m can establish a direct connection to the block storage 108 via a storage area network (SAN) or any other suitable medium. In another embodiment, the block storage 108 can be configured as (i) cloud-based storage using, for example, the Amazon EC2™ web service, the Microsoft Azure™ cloud platform, or the Google Cloud™ platform, or (ii) SDS using, for example, the ScaleIO® SDS product offered by Dell EMC™, Hopkinton, Mass. USA. For example, if the block storage 108 is configured as SDS, then the NAS data nodes 106.1, 106.2, . . . , 106.m may access the block storage 108 as direct-attached block storage, which the ScaleIO® SDS product can virtualize and make available for use across the cluster 103. It is noted that the block storage 108 can include any suitable combination of block-based data storage and/or cloud-based data storage. In a further embodiment, the block storage 108 can be configured as SDS by abstracting application programming interfaces (APIs) for platform management, data storage provisioning, and/or data services, among other features and/or services.

Figure 2:
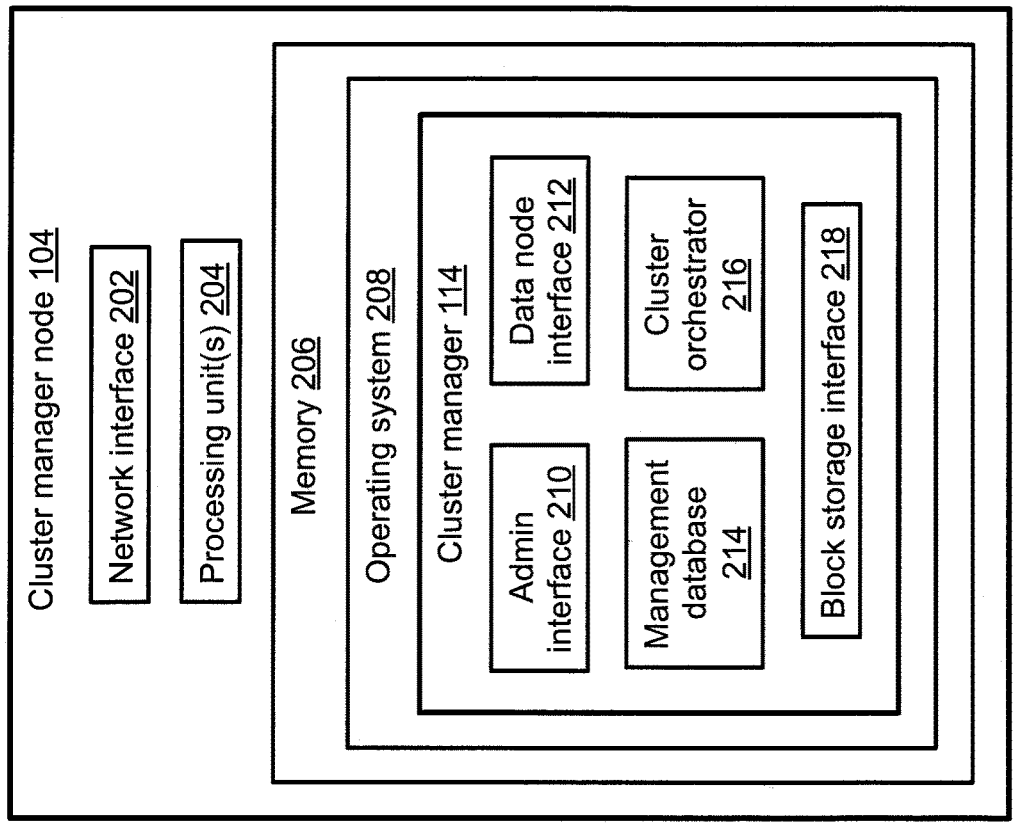
FIG. 2 is a block diagram of an exemplary cluster manager node included in the clustered storage environment of FIG. 1.

FIG. 2 depicts an exemplary representation of the cluster manager node 104 of FIG. 1. As shown in FIG. 2, the cluster manager node 104 includes a network interface 202, one or more processing units 204, and a memory 206. The network interface 202 can include one or more network interface adapters for converting electronic and/or optical signals received over the computer network 110 into electronic form for use by the cluster manager 114. The processing unit(s) 204 can include one or more processing chips and/or assemblies, including one or more multi-core central processing units (CPUs). The memory 206 can include volatile memory (e.g., random access memory (RAM)), as well as non-volatile memory (e.g., read-only memory (ROM), disk drives, solid state drives).

The processing unit(s) 204 and the memory 206 together form control circuitry configured to carry out the various methods and/or functions of the cluster manager node 104, as described herein. For example, the memory 206 may store a variety of software constructs realized in the form of executable instructions, which, when executed by the processing unit(s) 204, cause the processing unit(s) 204 to carry out the methods and/or functions of the cluster manager node 104. As shown in FIG. 2, the memory 206 can store an operating system 208 (e.g., Linux, Unix, Windows operating system), in which the cluster manager 114 is resident. Several software constructs can be included in the cluster manager 114, such as an administrative interface 210, a data node interface 212, a management database 214, a cluster orchestrator 216, and a block storage interface 218. The administrative interface 210 can be configured to provide a graphical user interface (GUI) display to enable a storage administrator to (i) query the cluster 103 to obtain a report(s) on the amount(s) of free storage space on a file system(s), (ii) establish data storage settings within the cluster 103, (iii) provision one or more of the NAS servers 116.1, 116.2, . . . , 116.m included in the NAS data nodes 106.1, 106.2, . . . , 106.m, respectively, (iv) create one or more file systems on the respective NAS data nodes 106.1, 106.2, . . . , 106.m, (v) perform load balancing within the cluster 103, (vi) take snapshots of local volumes of the NAS data nodes 106.1, 106.2, . . . , 106.m, (vii) perform data replication operations, and/or (viii) perform any other suitable administrative operations and/or tasks.

The data node interface 212 can be configured to allow the cluster manager node 104 to communicate with the respective NAS data nodes 106.1, 106.2, . . . , 106.m over the LAN 112, using the transmission control protocol/Internet protocol (TCP/IP) or any other suitable protocol. The management database 214 can be configured to store information about the cluster 103, as well as information about the respective NAS data nodes 106.1, 106.2, . . . , 106.m. The cluster orchestrator 216 can be configured to manage one or more procedures involving various data services provided within and/or between the respective NAS data nodes 106.1, 106.2, . . . , 106.m. The block storage interface 218 can be configured as a control interface to the block storage 108. For example, the block storage interface 218 may include a representational state transfer (REST) interface, which provides a generalized control interface to various different types of block storage. Although certain software constructs are specifically shown and described herein, it is noted that the memory 206 can store any other suitable software constructs, such as various different software applications, processes, and/or daemons.

Figure 3:
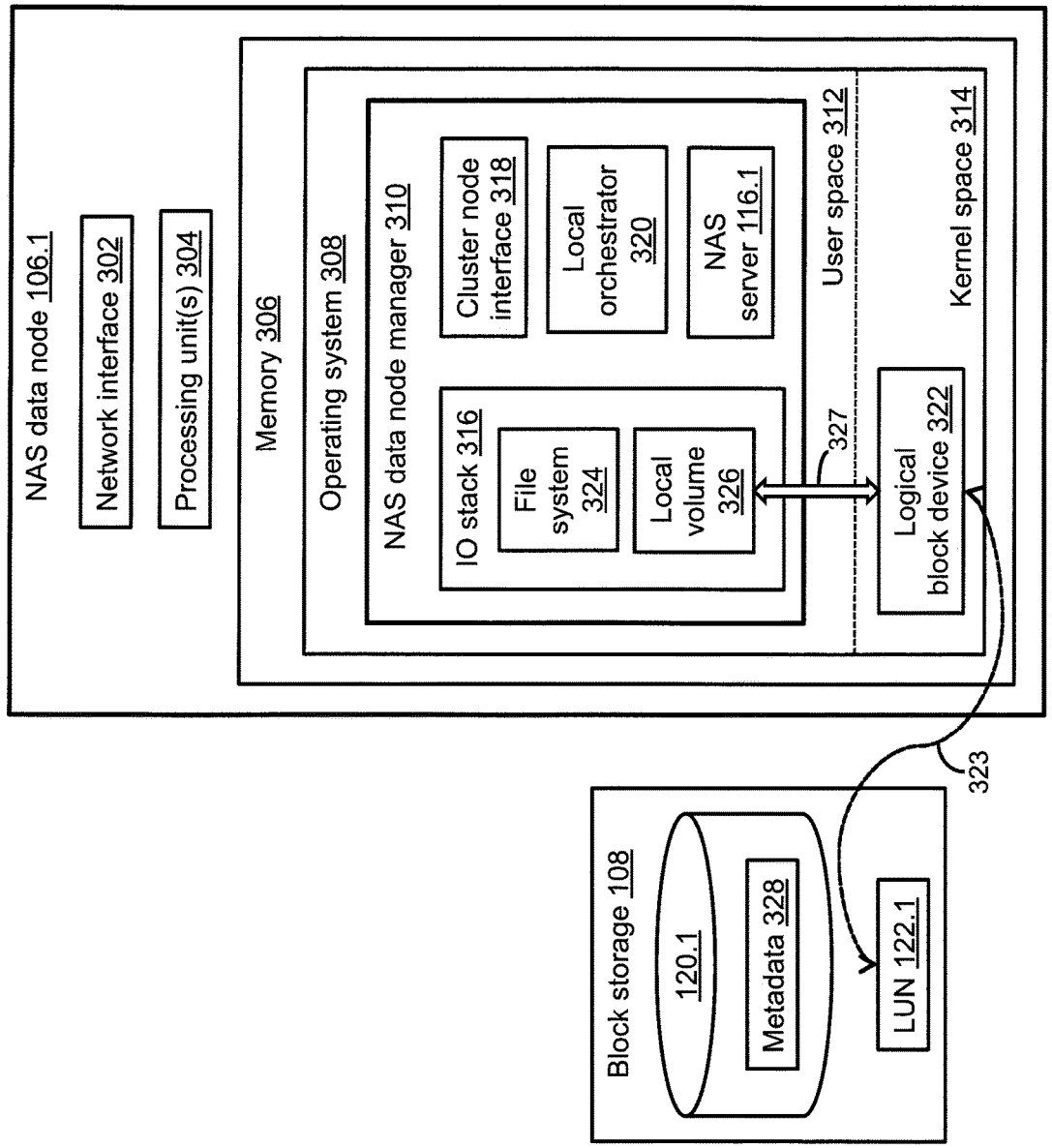
FIG. 3 is a block diagram of one of a plurality of network attached storage (NAS) data storage nodes and its underlying storage, each of which is included in the clustered storage environment of FIG. 1.

FIG. 3 depicts an exemplary representation of the NAS data node 106.1 of FIG. 1. It is noted that each of the remaining NAS data nodes 106.2, . . . , 106.m of FIG. 1 can be configured like the NAS data node 106.1. As shown in FIG. 3, the NAS data node 106.1 can include a network interface 302, one or more processing units 304, and a memory 306. For example, the network interface 302, the processing unit(s) 304, and the memory 306 may be configured like the network interface 202, the processing unit(s) 204, and the memory 206, respectively, as described herein with reference to the cluster manager node 104 (see FIG. 2). It is noted, however, that the processing unit(s) 304 and the memory 306 within the NAS data node 106.1 can be optimized for efficiently moving data within the clustered storage environment 100, and can therefore include processing and/or memory resources that are more extensive than those described herein with reference to the cluster manager node 104.

The processing unit(s) 304 and the memory 306 together form control circuitry configured to carry out the various methods and/or functions of the NAS data node 106.1, as described herein. For example, like the memory 206 within the cluster manager node 104 (see FIG. 2), the memory 306 within the NAS data node 106.1 (see FIG. 3) may store a variety of software constructs realized in the form of executable instructions, which, when executed by the processing unit(s) 304, cause the processing unit(s) 304 to carry out the methods and/or functions of the NAS data node 106.1. As shown in FIG. 3, the memory 306 can store an operating system 308 (e.g., Linux, Unix, Windows operating system) with a user space 312, in which a NAS data node manager 310 is resident. Several software constructs can be included in the NAS data node manager 310, such as an IO stack 316, a cluster node interface 318, a local orchestrator 320, and the NAS server 116.1. The IO stack 316 can be configured to provide an execution path for processing IO requests (e.g., read requests, write requests) received at the NAS data node 106.1 from the respective host computers 102.1, 102.2, . . . , 102.n. As shown in FIG. 3, at least one file system 324 can be deployed on at least one local volume 326 within the IO stack 316. The IO stack 316 can be further configured to convert read requests and/or write requests directed to a particular file and/or directory of the file system 324 to corresponding block-based requests suitable for submission to the block storage 108. The cluster node interface 318 can be configured as a management and/or control interface to the cluster manager 114 via the data node interface 212 (see FIG. 2). The local orchestrator 320 can be configured to manage one or more procedures involving various storage services within the NAS data node 106.1. The NAS server 116.1, to which the file system 324 belongs, can include a file system database that identifies the file system 324 and possibly one or more other file systems belonging to the NAS server 116.1.

As further shown in FIG. 3, the operating system 308 also has a kernel space 314 that can accommodate a logical block device 322, such as a Linux block device or any other suitable block device. In one embodiment, the local volume 326 can built on the logical block device 322 (as illustrated with reference to an arrow 327), and, once the LUN 122.1 is available, the logical block device 322 can be built on the LUN 122.1 (as illustrated with reference to an arrow 323), which can be provisioned from the block storage 108. It is noted that the file system 324, the local volume 326, the logical block device 322, and the LUN 122.1 have distinct address spaces, which may or may not have a one-to-one correspondence to one another. For example, the file system 324 may have an address space divided into a plurality of address blocks, in which each address block corresponds to the smallest unit of data storage that can be mapped or allocated by the file system 324. Further, the IO stack 316 may be configured to map IO requests (e.g., read requests, write requests) from the host computers 102.1, 102.2, ..., 102.*n* to corresponding reads and/or writes of the address blocks within the address space of the file system 324. The block storage 108 can be configured to provide persistent data storage for the file system 324, storing user data and/or metadata (i.e., the metadata 328) of the file system 324 on the storage drive 120.1 arranged as the LUN 122.1. For example, the metadata 328 may include one or more file names, one or more identifiers identifying one or more volumes in which data blocks associated with the file names are stored, and/or any other suitable metadata.

During operation, the cluster 103 of NAS data nodes 106.1, 106.2, ..., 106.*m* (see FIG. 1) can limit the maximum data storage consumed by file systems implemented on the NAS data nodes 106.1, 106.2, ..., 106.*m*, without shrinking local volumes upon which the respective file systems are deployed. For example, with reference to the NAS data node 106.1 (see FIG. 3), the file system 324 may be deployed on the local volume 326, which may be configured as a thin volume. Storage space required by the local volume 326 configured as a thin volume is not mapped or allocated at its creation, but can be provided, up to the size of the file system 324, at a later time based on demand.

Figure 4:
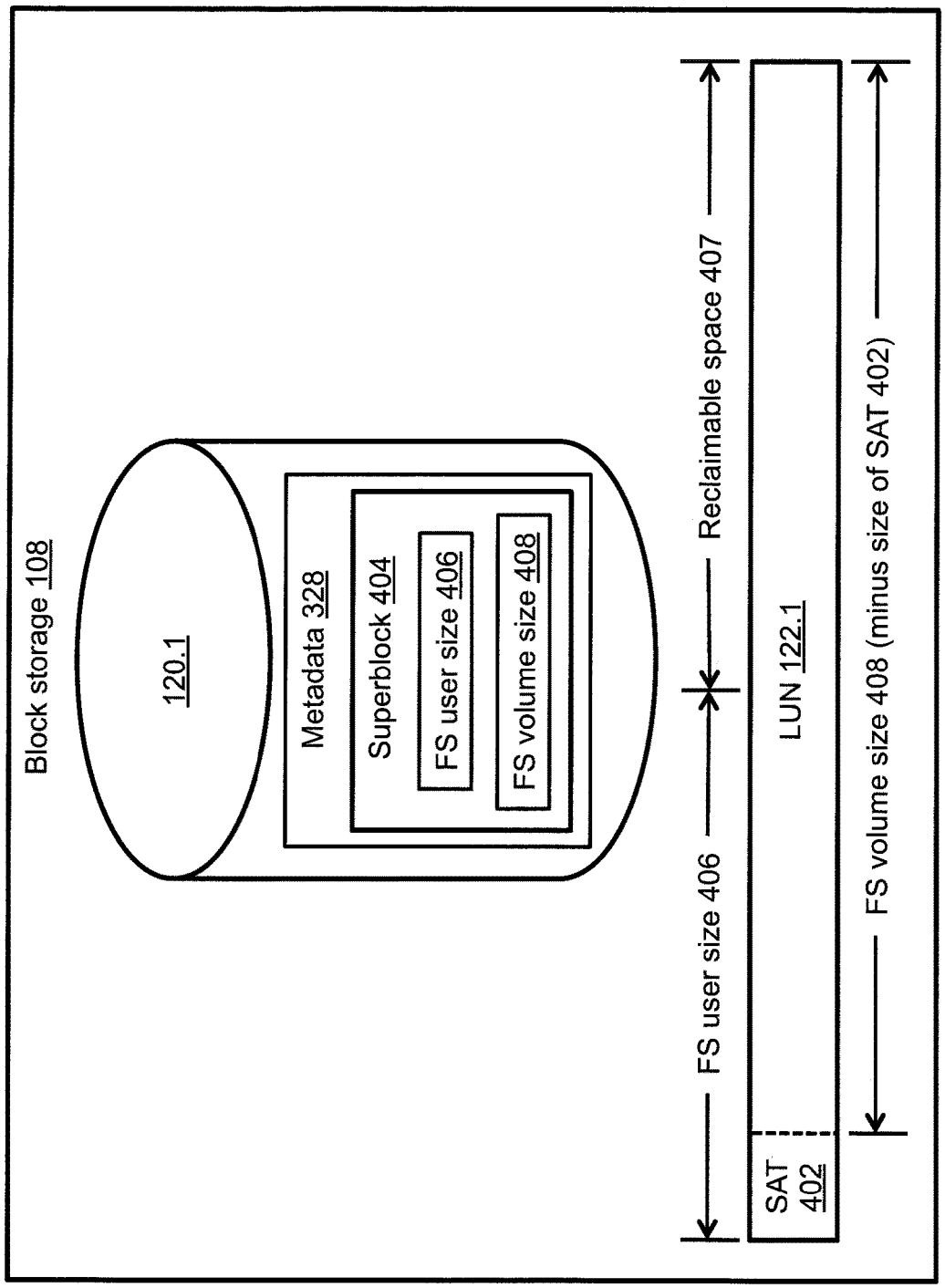
FIG. 4 is a block diagram of the block storage of FIG. 3, including illustrations of a user size and a local volume size associated with the file system of FIG. 1.

The operation of the NAS data node 106.1 for limiting the maximum data storage consumed by the file system 324, without shrinking the local volume 326 upon which the file system 324 is deployed, is further described herein with reference to the following illustrative example, as well as FIGS. 3 and 4. It is noted that each of the remaining NAS data nodes 106.2, ..., 106.*m* within the cluster 103 can operate like the NAS data node 106.1. In this example, the block storage 108 stores user data and/or metadata of the file system 324 (see FIG. 3) on the storage drive 120.1 arranged as the LUN 122.1. As shown in FIG. 4, the block storage 108 further stores the metadata 328, which includes a superblock 404 containing a user size 406 of the file system 324 (also referred to herein as the "FS user size"), as well as a total size 408 of the local volume 326 (also referred to herein as the "FS volume size"). For example, the FS user size 406 may initially be set to 32 terabytes (TB) or any other suitable size, and the FS volume size 408 may be greater than or equal to the FS user size 406. It is noted that the FS user size 406 may or may not correspond to contiguous storage space on the LUN 122.1. It is further noted that the size of the LUN 122.1, if available, can correspond to the total size of the local volume 326, i.e., the FS volume size 408.

On the NAS data node 106.1, one or more slices of data storage can be provisioned, as desired and/or required, to the local volume 326, in which each slice is a uniformly-sized data storage extent having a size equal to 256 megabytes (MB) or any other suitable size. Further, the file system 324 can employ a slice allocation table (SAT) 402 to track each slice provisioned to the local volume 326. As shown in FIG. 4, the SAT 402 for the file system 324 can be stored on the LUN 122.1. Further, the FS user size 406 can include the size of the SAT 402 (which can be equal to 256 MB or any other suitable size), while the FS volume size 408 (which is greater than or equal to the FS user size 406) can omit the size of the SAT 402. Such is the case in FIG. 4, which depicts the FS volume size 408 minus the size of the SAT 402. It is noted, however, that, in other embodiments, the FS user size 406 can include or omit the size of the SAT 402, while the FS volume size 408 can omit or include the size of the SAT 402.

In this example, the NAS data node 106.1 deploys the file system 324 on its local volume 326, and an initial value of the FS user size 406 is set (either automatically or by a system administrator) to be equal to the FS volume size 408, such as 32 TB or any other suitable size. The NAS data node 106.1 stores both the FS user size 406 and the FS volume size 408 within the superblock 404 of the metadata 328. The NAS data node 106.1 then receives an IO request, namely, a write request, from a host computer (i.e., one of the host computers 102.1 102.2, ..., 102.*n*), to write data to a specified file or directory of the file system 324. Having received the write request, the NAS data node 106.1 determines whether or not the write request can be satisfied within a logical limit of the FS user size 406, which has the initial value of 32 TB. In other words, the availability of free storage space on the local volume 326 is checked against the 32 TB limit. If it is determined that the write request can be satisfied within the logical limit of the FS user size 406, then the NAS data node 106.1 maps or allocates the write request to corresponding address blocks of the address space of the local volume 326, which are translated to allow the data to be ultimately written to suitable address blocks of the address space of the LUN 122.1.

Otherwise, if it is determined that the write request cannot be satisfied within the logical limit of the FS user size 406 (which has the initial value of 32 TB), then the FS volume size 408 (which is currently equal to 32 TB) can be extended by a predetermined amount to obtain an extended FS volume size 408. For example, the FS volume size 408 may be extended from 32 TB to 64 TB or any other suitable size. Further, the FS user size 406 may be set (either automatically or by the system administrator) to be equal to the extended FS volume size 408 of 64 TB or any other suitable value, so long as the resulting FS user size 406 is less than or equal to the extended FS volume size 408. The NAS data node 106.1 stores the new value of the FS user size 406 and the extended FS volume size 408 within the superblock 404 of the metadata 328, overwriting the prior FS user size and FS volume size previously stored on the LUN 122.1. Once the value of the FS user size 406 has been set to be equal to the extended FS volume size 408, the NAS data node 106.1 maps or allocates the write request to corresponding address blocks of the address space of the extended local volume 326, which are translated to allow the data to be ultimately written to suitable address blocks of the address space of the LUN 122.1, assuming sufficient free storage space is available for use on the LUN 122.1.

By deploying the file system 324 on the thin local volume 326, and provisioning storage space to the file system 324 without extending provisioning activities to the LUN 122.1 (e.g., without reserving storage space and/or confirming its availability on the LUN 122.1), communication is simplified between the NAS data node 106.1 and the block storage 108 within the clustered storage environment 100. It is noted, however, that provisioning storage space to the file system 324 without reserving storage space and/or confirming its availability on the LUN 122.1 can carry the risk of a write failure, as the block storage 108 may be incapable of supplying the storage space needed to support a write request. Such a risk of a write failure can be mitigated by providing increased numbers of NAS data nodes 106.1, 106.2, ..., 106.*m* in the cluster 103. Such increased numbers of NAS data nodes 106.1, 106.2, ..., 106.*m* can produce stable and predictable storage demands, such that a sudden increase in storage requirements triggered by a single user or a small number of users would likely represent a relatively small percentage change in the overall storage requirements within the cluster 103. Moreover, the cluster 103 of NAS data nodes 106.1, 106.2, ..., 106.*m* is configured to provide shared access to the block storage 108, which can have a large data storage capability. In the clustered storage environment 100, the level of risk associated with provisioning storage space to the file system 324, without reserving storage space and/or confirming its availability on the LUN 122.1, is therefore relatively low. Such simplified communication between a NAS data node and its underlying storage is further described in U.S. patent application Ser. No. 15/664,993 filed Jul. 31, 2017 entitled MANAGING FILE SYSTEM TAILORED FOR CLUSTER DEPLOYMENT, the disclosure of which is incorporated herein by reference in its entirety.

If, at a later time, it is desired to reduce the size of the file system 324, for example, due to a reduction in the storage space required by the file system 324, then the value of the FS user size 406 can be set (either automatically or by the system administrator) to a predetermined lesser value than the value of the FS user size 406 currently stored on the LUN 122.1, without shrinking the local volume 326 upon which the file system 324 is deployed. For example, the value of the FS user size 406 may be set to 32 TB (or any other suitable value), which is less than the value, 64 TB, of the FS user size 406 currently stored on the LUN 122.1. Further, while the FS user size 406 may be set to the lesser value of 32 TB, the FS volume size 408 of 64 TB can remain unchanged. The NAS data node 106.1 stores the lesser value of the FS user size 406 within the superblock 404 of the metadata 328, overwriting the prior FS user size previously stored on the LUN 122.1. Subsequent IO requests received at the NAS data node 106.1 from the host computer (i.e., one of the host computers 102.1 102.2, ..., 102.*n*) are then satisfied within a logical limit of the lesser value, 32 TB, of the FS user size 406. It is noted that, based on the total amount of aggregate free storage space available on the LUN 122.1 (including storage space not previously written to, as well as storage space previously written to and subsequently freed), the value of the FS user size 406 can be reduced by that total amount of aggregate free space.

Once the value of the FS user size 406 is set to be less than the FS volume size 408, as graphically illustrated in FIG. 4, at least some address blocks within the address space of the local volume 326 that were previously written to and subsequently freed can be unmapped or de-allocated in a background process, freeing up or reclaiming storage space on the LUN 122.1 that might be used for other purposes. Such reclaimable space 407 (which may or may not correspond to contiguous storage space on the LUN 122.1) is also graphically illustrated in FIG. 4. In one embodiment, the background process is implemented as a program for scavenging free storage space on the thin local volume 326. For example, such scavenging of free storage space may be performed in a thinly provisioned upper deck file system stored in the form of a file in a lower deck file system. Further, a set of data structures may be accessed to identify the location of each of a set of backed free blocks within the upper deck file system, in which the set of backed free blocks include blocks that have been (i) provisioned to the lower deck file system, (ii) allocated from the lower deck file system to the upper deck file system, and (iii) later freed from the upper deck file system. Such scavenging of free storage space on a thin volume is further described in U.S. Pat. No. 9,430,492 issued Aug. 30, 2016 entitled EFFICIENT SCAVENGING OF DATA AND METADATA FILE SYSTEM BLOCKS, the disclosure of which is incorporated herein by reference in its entirety.

By deploying the file system 324 on the local volume 326 of the NAS data node 106.1 within the clustered storage environment 100, setting an initial value of the FS user size 406 to be equal to the FS volume size 408, and, if, at a later time, it is desired to reduce the size of the file system 324, setting the value of the FS user size 406 to a predetermined lesser value than the FS volume size 408 while allowing the FS volume size 408 to remain unchanged, IO requests subsequently received at the NAS data node 106.1 can be satisfied within a logical limit of the lesser value of the FS user size 406, without shrinking the local volume 326. In this way, the size of the file system 326 implemented on the NAS data node 106.1 in the clustered storage environment 100 can be reduced, without requiring close coordination with the underlying block storage 108.

As described herein, the administrative interface 210 included in the cluster manager 114 of the cluster manager node 104 can be configured to provide a GUI display, enabling a storage administrator to obtain a report on the amount of free storage space on a file system within the clustered storage environment 100. More specifically, the storage administrator can issue, via the GUI display of the cluster manager node 104, a Unix "df" command to obtain a report on the amount of free storage space on the file system 324 deployed on the local volume 326 of the NAS data node 106.1. For example, the value of the FS user size 406 may be set to 32 TB or any other suitable value, and the FS volume size 408 may be equal to 32 TB or any other suitable size. Further, in response to the df command, the cluster manager node 104 may provide, to the system administrator via the GUI display, the following reporting information for the file system 324:

| $ df | | | |
|------|------|------|------|
| File system 324 | | | |
| Size | Used | Avail | Use % |
| 32 TB | 20.8 TB | 11.2 TB | 65%, | in which "Size" corresponds to the FS user size 406 of the file system 324 (i.e., 32 TB), "Used" corresponds to an exemplary amount of storage space within the logical limit of the FS user size 406 that contains user data and/or metadata of the file system 324 (e.g., 20.8 TB), "Avail" corresponds to the amount of free storage space available within the logical limit of the FS user size 406 of the file system 324 (i.e., 32 TB-20.8 TB=11.2 TB), and "Use %" corresponds to the percentage of the FS user size 406 of the file system 324 that is currently being used (i.e., 20.8 TB÷32 TB=0.65 or 65%).

In this example, the FS user size 406 cannot be set to a value less than 20.8 TB, which is the exemplary amount of storage space within the logical limit of the FS user size 406 that currently contains user data and/or metadata, i.e., the amount of storage space that is currently being used. It is noted, however, that the FS user size 406 can be set to a value ranging from 20.8 TB to 32 TB, which corresponds to the current FS user size 406 of the file system 324. For example, the FS user size 406 may be set to 25 TB (or any other suitable value ranging from 20.8 TB to 32 TB), reducing the amount of free storage space available in the file system 324 from 11.2 TB (i.e., 32 TB-20.8 TB=11.2 TB) to 4.2 TB (i.e., 25 TB-20.8 TB=4.2 TB). Further, in response to a subsequent df command, the cluster manager node 104 may provide, to the system administrator via the GUI display, the following reporting information for the file system 324:

| $ df File system 324 | | | |
|---|---|---|---|
| Size | Used | Avail | Use % |
| 25 TB | 20.8 TB | 4.2 TB | 83%, | in which "Size" corresponds to the FS user size 406 (i.e., 25 TB), "Used" corresponds to the exemplary amount of storage space within the logical limit of the FS user size 406 that contains user data and/or metadata of the file system 324 (e.g., 20.8 TB), "Avail" corresponds to the amount of free storage space available within the logical limit of the FS user size 406 of the file system 324 (i.e., 25 TB-20.8 TB=4.2 TB), and "Use %" corresponds to the percentage of the FS user size 406 of the file system 324 that is currently being used (i.e., 20.8 TB+25 TB=0.832 or about 83%). Once the FS user size 406 is reduced to 25 TB, the program for scavenging free storage space on the thin local volume 326 can operate as a background process to un-map or de-allocate, as appropriate, any freed blocks within the reclaimable space 407 (see FIG. 4), which, in this example, has a size of 7 TB (i.e., 32 TB-25 TB=7 TB).

Figure 5:
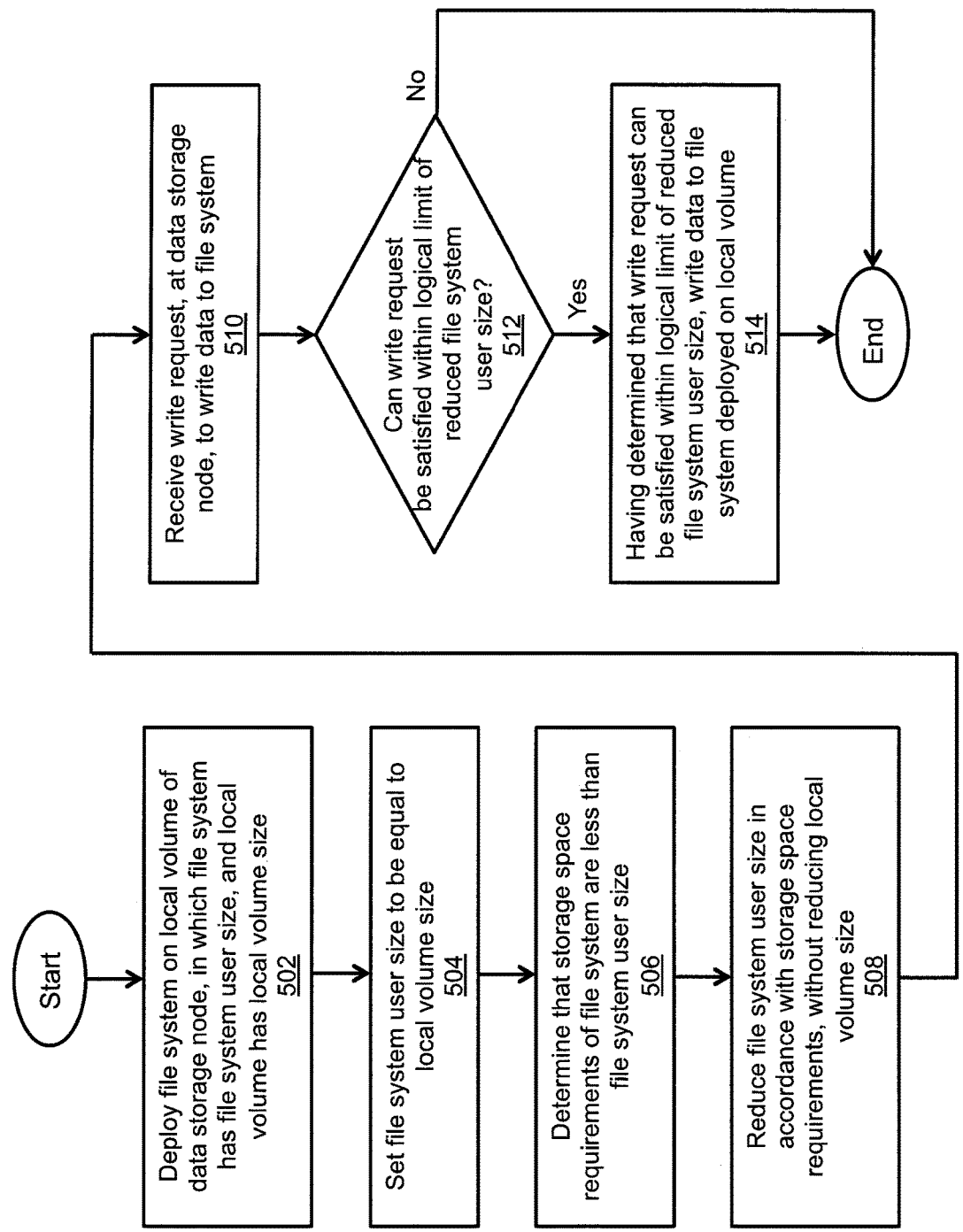
FIG. 5 is an exemplary method of limiting the maximum data storage consumed by the file system of FIG. 1, without shrinking the local volume upon which the file system is deployed.

An exemplary method of limiting the maximum data storage consumed by a file system, without shrinking a local volume upon which the file system is deployed, is described below with reference to FIG. 5. As depicted in block 502, a file system is deployed on a local volume of a data storage node, in which the file system has a file system user size and the local volume has a local volume size. As depicted in block 504, the file system user size is set to be equal to the local volume size. As depicted in block 506, storage space requirements of the file system are determined to be less than the file system user size. As depicted in block 508, the file system user size is reduced in accordance with the storage space requirements of the file system, without reducing the local volume size. As depicted in block 510, a write request is received, at the data storage node, to write data to the file system. As depicted in block 512, a determination is made as to whether the write request can be satisfied within a logical limit of the reduced file system user size. As depicted in block 514, having determined that the write request can be satisfied within the logical limit of the reduced file system user size, the data is written to the file system deployed on the local volume.

Having described the foregoing illustrative embodiments, other alternative embodiments and/or variations may be made and/or practiced. For example, it was described herein that, once the value of the FS user size 406 is set to be less than the FS volume size 408, at least some address blocks within the address space of the local volume 326 that were previously written to and subsequently freed can be unmapped or de-allocated in a background process, freeing up or reclaiming storage space on the LUN 122.1 that might be used for other purposes. In one embodiment, the reclaimable space 407, as graphically illustrated in FIG. 4, may actually be less than the amount of free storage space available within the logical limit of the FS user size 406. For example, the amount of available space (see, e.g., the reporting information, "Avail," as described herein with reference to the df command) may be equal to the sum of (i) the free space in the local volume 326, (ii) free blocks associated with metadata and/or data slices, and (iii) backed free blocks associated with metadata and/or data slices. The free blocks associated with metadata and/or data slices correspond to blocks that were never written to and therefore do not consume any storage space, while the backed free blocks associated with metadata and/or data slices correspond to blocks that were previously written to and therefore consume some storage space. It is noted that, once one or more snapshots are taken of the local volume 326, it may be necessary to proactively perform scavenging of the snapshots to free up or reclaim the storage space consumed by the backed free blocks. Such proactive scavenging of file system snapshots is described in U.S. Pat. No. 9,940,331 issued Apr. 10, 2018 entitled PROACTIVE SCAVENGING OF FILE SYSTEM SNAPS, the disclosure of which is incorporated herein by reference in its entirety.

It was further described herein that the disclosed techniques can be employed to reduce the size of a file system implemented on a network attached storage (NAS) data node, without requiring close coordination between the file system and underlying storage. In an alternative embodiment, the disclosed techniques can be employed to reduce the size of a file system in an environment where the file system and underlying storage are more tightly coupled, requiring closer coordination between the file system and the underlying storage.

It is noted that, having described the foregoing illustrative embodiments within the clustered storage environment 100 of FIG. 1, such illustrative embodiments may be practiced in other clustered environments or in non-clustered environments. As employed herein, the term "cluster" refers to an electronic system that includes multiple data nodes having access to block storage and configured to service file-based requests for data over a computer network. Further, the term "data node" refers to a node that processes IO requests from host computers for performing reads and/or writes of data persisted in the block storage. For example, such a data node may be realized on a physical computing machine, in a virtual machine, or in a container running on a physical computing machine.

It is further noted that the disclosed embodiments or portions thereof can be embodied as a computer program product including one or more non-transient, computer-readable storage media, such as magnetic disks, magnetic tapes, compact disks (CDs), digital versatile disks (DVDs), optical disks, flash drives, solid state drives (SSDs), secure digital (SD) chips or devices, application specific integrated circuits (ASICs), field programmable gate arrays (FPGAs), and/or any other suitable media. Such media may be encoded with instructions that, when executed by one or more computers or processors, perform the methods and/or processes described herein. Such media may be considered to be articles of manufacture or machines, and may be transportable from one machine to another machine.

While various embodiments of the invention have been particularly shown and described, it will be understood by those skilled in the art that various changes in form and/or details may be made therein without departing from the scope of the invention, as defined by the appended claims.

What is claimed is:

1. A method of limiting the maximum data storage consumed by a file system, without shrinking a local volume upon which the file system is deployed, comprising:
deploying the file system on a local volume of a data storage node, the file system having a file system user size, and the local volume having a local volume size;
setting the file system user size to be equal to the local volume size;
determining that storage space requirements of the file system are less than the file system user size;
reducing the file system user size in accordance with the storage space requirements of the file system, without reducing the local volume size;
receiving, at the data storage node, a first write request to write first data to the file system;
determining whether the first write request can be satisfied within a logical limit of the reduced file system user size; and
having determined that the first write request cannot be satisfied within the logical limit of the reduced file system user size, performing one of:
(i) increasing the file system user size up to or less than the local volume size, without extending the local volume size;
(ii) extending the local volume size in accordance with the storage space requirements of the file system and setting the file system user size to be equal to the extended local volume size to obtain an increased file system user size; and
(iii) issuing a write failure indication with respect to the file system due to insufficient storage space.

2. The method of claim 1 further comprising:
receiving, at the data storage node, a second write request to write second data to the file system;
determining whether the second write request can be satisfied within a logical limit of the reduced file system user size; and
having determined that the second write request can be satisfied within the logical limit of the reduced file system user size, writing the second data to the file system deployed on the local volume.

3. The method of claim 1 further comprising:
performing, in a background process, a scavenging operation to un-map or de-allocate at least some address blocks within an address space of the local volume that were previously written to and subsequently freed.

4. The method of claim 1 further comprising:
having set the file system user size to be equal to the extended local volume size to obtain the increased file system user size:
determining whether the first write request can be satisfied within a logical limit of the increased file system user size; and
having determined that the first write request can be satisfied within the logical limit of the increased file system user size, writing the first data to the file system deployed on the local volume.

5. In a clustered storage environment, a data storage node connected to a host computer by a computer network, the data storage node comprising:
an interface to the computer network;
a memory; and
one or more processing units configured to execute one or more programs out of the memory:
to deploy a file system on a local volume of the data storage node, the file system having a file system user size, and the local volume having a local volume size;
to facilitate setting the file system user size to be equal to the local volume size;
to facilitate determining that storage space requirements of the file system are less than the file system user size;
to facilitate reducing the file system user size in accordance with the storage space requirements of the file system, without reducing the local volume size;
to receive a first write request to write first data to the file system;
to determine whether the first write request can be satisfied within a logical limit of the reduced file system user size; and
having determined that the first write request cannot be satisfied within the logical limit of the reduced file system user size, to perform one of:
(i) increasing the file system user size up to or less than the local volume size, without extending the local volume size;
(ii) facilitating setting the file system user size to be equal to an extended local volume size to obtain an increased file system user size, the local volume size being extended in accordance with the storage space requirements of the file system; and
(iii) issuing a write failure indication with respect to the file system due to insufficient storage space.

6. The data storage node of claim 5 wherein the one or more processing units are further configured to execute the one or more programs out of the memory:
to receive a second write request to write second data to the file system;
to determine whether the second write request can be satisfied within a logical limit of the reduced file system user size; and
having determined that the second write request can be satisfied within the logical limit of the reduced file system user size, to write the second data to the file system deployed on the local volume.

7. The data storage node of claim 5 wherein the one or more processing units are further configured to execute the one or more programs out of the memory to perform, in a background process, a scavenging operation to un-map or de-allocate at least some address blocks within an address space of the local volume that were previously written to and subsequently freed.

8. The data storage node of claim 5 wherein the one or more processing units are further configured to execute the one or more programs out of the memory:
having facilitated the setting of the file system user size to be equal to the extended local volume size to obtain the increased file system user size:
to determine whether the first write request can be satisfied within a logical limit of the increased file system user size; and
having determined that the first write request can be satisfied within the logical limit of the increased file system user size, to write the first data to the file system deployed on the local volume.

9. A computer program product including a set of non-transitory, computer-readable media having instructions that, when executed by control circuitry of a computerized apparatus, cause the control circuitry to perform a method of operating a file system, the method comprising:

deploying the file system on a local volume of a data storage node, the file system having a file system user size, and the local volume having a local volume size;
setting the file system user size to be equal to the local volume size;
determining that storage space requirements of the file system are less than the file system user size;
reducing the file system user size in accordance with the storage space requirements of the file system, without reducing the local volume size;
receiving, at the data storage node, a first write request to write first data to the file system;
determining whether the first write request can be satisfied within a logical limit of the reduced file system user size; and
having determined that the first write request cannot be satisfied within the logical limit of the reduced file system user size, performing one of:
  (i) increasing the file system user size up to or less than the local volume size, without extending the local volume size;
  (ii) extending the local volume size in accordance with the storage space requirements of the file system and setting the file system user size to be equal to the extended local volume size to obtain an increased file system user size; and
  (iii) issuing a write failure indication with respect to the file system due to insufficient storage space.

10. The method of claim 9 further comprising:
receiving, at the data storage node, a second write request to write second data to the file system;
determining whether the second write request can be satisfied within a logical limit of the reduced file system user size; and
having determined that the second write request can be satisfied within the logical limit of the reduced file system user size, writing the second data to the file system deployed on the local volume.

11. The method of claim 9 further comprising:
performing, in a background process, a scavenging operation to un-map or de-allocate at least some address blocks within an address space of the local volume that were previously written to and subsequently freed.

12. The method of claim 9 further comprising:
having set the file system user size to be equal to the extended local volume size to obtain the increased file system user size:
  determining whether the first write request can be satisfied within a logical limit of the increased file system user size; and
  having determined that the first write request can be satisfied within the logical limit of the increased file system user size, writing the first data to the file system deployed on the local volume.

* * * * *